United States Patent
Hochmuth et al.

(10) Patent No.: US 12,507,923 B2
(45) Date of Patent: *Dec. 30, 2025

(54) ANALYTE SENSOR AND A METHOD FOR PRODUCING AN ANALYTE SENSOR

(71) Applicant: Roche Diabetes Care, Inc., Indianapolis, IN (US)

(72) Inventors: Gernot Hochmuth, Mannheim (DE); Kirill Sliozberg, Mannheim (DE); Alexander Steck, Hirschberg (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,087

(22) Filed: Sep. 21, 2022

(65) Prior Publication Data

US 2023/0051071 A1 Feb. 16, 2023

Related U.S. Application Data

(63) Continuation of application No. PCT/EP2021/066854, filed on Jun. 21, 2021.

(30) Foreign Application Priority Data

Jun. 23, 2020 (EP) .................................... 20181542

(51) Int. Cl.
*A61B 5/145* (2006.01)
*A61B 5/1486* (2006.01)
*G01N 27/327* (2006.01)

(52) U.S. Cl.
CPC ...... *A61B 5/14865* (2013.01); *A61B 5/14532* (2013.01); *G01N 27/3275* (2013.01)

(58) Field of Classification Search
CPC ............ A61B 5/14865; A61B 5/14532; G01N 27/3275
See application file for complete search history.

(56) References Cited

U.S. PATENT DOCUMENTS 3,847,370 A 11/1974 Engelsher
5,413,690 A 5/1995 Kost et al.
(Continued)

FOREIGN PATENT DOCUMENTS

AR 058552 A1 2/2008
AU 2020210301 B2 2/2021
(Continued)

OTHER PUBLICATIONS

International Search Report and Written Opinion of the International Searching Authority, PCT/EP2021/066854, Sep. 3, 2021, 12 pages.
(Continued)

*Primary Examiner* — Alex M Valvis
*Assistant Examiner* — Grace L Rozanski
(74) *Attorney, Agent, or Firm* — Bose McKinney & Evans LLP

(57) ABSTRACT

A fully or partially implantable analyte sensor for continuously monitoring analyte concentration in a body fluid has a substrate with a first surface configured to face towards the body fluid. The sensor has a working electrode and an interferent electrode. The interferent electrode and the working electrode are electrically separated layers located adjacently on the first surface. The sensor has a further electrode, the further electrode being a counter electrode, a reference electrode or a counter/reference electrode. The working electrode and the interferent electrode each have a layer of a conductive material. The working electrode has an enzyme whereas the interferent electrode is devoid of enzyme. A
(Continued)

method for producing the fully or partially implantable analyte sensor for continuously monitoring analyte concentration in a body fluid is also disclosed.

17 Claims, 3 Drawing Sheets

(56) References Cited

U.S. PATENT DOCUMENTS

| | | | |
|---|---|---|---|
| 5,762,770 | A | 6/1998 | Pritchard et al. |
| 5,798,031 | A | 8/1998 | Charlton et al. |
| 6,129,823 | A | 10/2000 | Hughes et al. |
| 6,360,888 | B1 | 3/2002 | McIvor et al. |
| 7,653,492 | B2 * | 1/2010 | Davies .............. C12Q 1/006 702/22 |
| 10,335,520 | B2 | 7/2019 | Phillips et al. |
| 2004/0111017 | A1 | 6/2004 | Say et al. |
| 2005/0013731 | A1 | 1/2005 | Burke et al. |
| 2007/0213611 | A1 | 9/2007 | Simpson et al. |
| 2008/0073207 | A1 | 3/2008 | Teodorczyk et al. |
| 2008/0179187 | A1 | 7/2008 | Ouyang et al. |
| 2008/0242962 | A1 | 10/2008 | Roesicke et al. |
| 2009/0156920 | A1 | 6/2009 | Kotzan et al. |
| 2009/0312614 | A1 | 12/2009 | Brenneman |
| 2010/0270175 | A1 | 10/2010 | Pei et al. |
| 2011/0259741 | A1 | 10/2011 | Murase et al. |
| 2012/0323098 | A1 * | 12/2012 | Moein .............. A61B 5/1486 29/832 |
| 2013/0131478 | A1 | 5/2013 | Simpson et al. |
| 2013/0199944 | A1 * | 8/2013 | Petisee .............. C12Q 1/005 204/403.11 |
| 2014/0318986 | A1 | 10/2014 | Elder et al. |
| 2015/0001070 | A1 | 1/2015 | Mackintosh |
| 2015/0241378 | A1 | 8/2015 | Liu et al. |
| 2016/0235347 | A1 * | 8/2016 | Baig .............. A61B 5/14532 |
| 2017/0042480 | A1 * | 2/2017 | Gandhi .............. A61B 5/14546 |
| 2019/0004000 | A1 * | 1/2019 | Jang .............. G01N 27/3275 |
| 2019/0079044 | A1 * | 3/2019 | Ringemann ........ G01N 27/3274 |
| 2020/0037932 | A1 * | 2/2020 | Lucisano .............. A61B 5/0031 |
| 2021/0030324 | A1 | 2/2021 | Huang et al. |

FOREIGN PATENT DOCUMENTS

| | | |
|---|---|---|
| CN | 111096754 A | 5/2020 |
| EP | 1 797 817 A1 | 6/2007 |
| EP | 2 261 646 A1 | 12/2010 |
| EP | 3 444 602 A1 | 2/2019 |
| EP | 3 771 410 A1 | 2/2021 |
| JP | 2003-503090 A | 1/2003 |
| JP | 2004-184155 A | 7/2004 |
| JP | 2011-242385 A | 12/2011 |
| JP | 2012-531947 A | 12/2014 |
| KR | 10-2016-0049340 A | 5/2016 |
| KR | 10-2173496 B1 | 11/2020 |
| RU | 2 485 887 C2 | 6/2013 |
| RU | 2 622 087 C2 | 6/2017 |
| RU | 2 669 550 C2 | 10/2018 |
| RU | 2 686 463 C2 | 4/2019 |
| TW | 202107078 A | 2/2021 |
| WO | WO 00/78992 A2 | 12/2000 |
| WO | WO 2014/037745 A1 | 3/2014 |
| WO | WO 2017/157894 A1 | 9/2017 |
| WO | WO 2021/023125 A1 | 2/2021 |

OTHER PUBLICATIONS

Third Party Observations Concerning Patentability of Invention, EP 20181542.0, Jul. 6, 2023, 32 pages.

* cited by examiner

ANALYTE SENSOR AND A METHOD FOR PRODUCING AN ANALYTE SENSOR

RELATED APPLICATIONS

This application is a continuation of PCT/EP2021/066854, filed Jun. 21, 2021, which claims priority to EP 20 181 542.0, filed Jun. 23, 2020, both of which are hereby incorporated herein by reference.

BACKGROUND

This disclosure relates to an analyte sensor for determining an analyte concentration in a body fluid and a method for producing an analyte sensor. The analyte sensor may, primarily, be used for a long-term monitoring of an analyte concentration in a body fluid, in particular of a glucose level or of a concentration of one or more other analytes in the body fluid. This disclosure may be applied both fields of home care and professional care, such as in hospitals. However, other applications are feasible.

Monitoring certain body functions, more particularly monitoring one or more concentrations of certain analytes, plays an important role in the prevention and treatment of various diseases. Without restricting further possible applications, this disclosure is described in the following with reference to glucose monitoring in an interstitial fluid. However, this disclosure can also be applied to other types of analytes. Glucose monitoring may, specifically, be performed by using electrochemical analyte sensors besides optical measurements. Examples of electrochemical analyte sensors for measuring glucose in body fluids are known from U.S. Pat. Nos. 5,413,690 A, 5,762,770 A, 5,798,031 A, 6,129,823 A or U.S. Publication No. 2005/0013731 A1.

In addition to "spot measurements" in which a sample of a body fluid is taken from a user, i.e., a human or an animal, in a targeted fashion and examined with respect to the analyte concentration, continuous measurements have become increasingly established. Thus, in the recent past, continuous measuring of glucose in the interstitial tissue, also referred to as "continuous glucose monitoring" or abbreviated to "CGM," has been established as another important method for managing, monitoring, and controlling a diabetes state. Herein, an active sensor region is applied directly to a measurement site which is, generally, arranged in an interstitial tissue, and may, for example, convert glucose into an electrically charged entity by using an enzyme, in particular glucose oxidase (GOD) and/or glucose dehydrogenase (GDH). As a result, the detectable charge may be related to the glucose concentration and can, thus, be used as a measurement variable. Examples are described in U.S. Pat. No. 6,360,888 B1 or U.S. Publication No. 2008/0242962 A1.

Typically, current continuous monitoring systems are transcutaneous systems or subcutaneous systems. Accordingly, the analyte sensor or at least a measuring portion of the analyte sensor may be arranged under the skin of the user. However, an evaluation and control part of the system, which may also be referred to as a "patch," may, generally, be located outside of the body of a user. Herein, the analyte sensor is generally applied by using an insertion instrument, which is, in an exemplary fashion, described in U.S. Pat. No. 6,360,888 B1. However, other types of insertion instruments are also known. Further, a control part may, typically, be required which may be located outside the body tissue and which has to be in communication with the analyte sensor. Generally, communication is established by providing at least one electrical contact between the analyte sensor and the control part, wherein the contact may be a permanent electrical contact or a releasable electrical contact. Other techniques for providing electrical contacts, such as by appropriate spring contacts, are generally known and may also be applied.

In continuous glucose measuring systems, the concentration of the analyte glucose may be determined by employing an analyte sensor comprising an electrochemical cell having at least a working electrode and a counter electrode. At least one further electrode, in particular at least one reference electrode, may also be feasible. If the analyte sensor has only two electrodes, it typically comprises at least one working electrode and a combined counter/reference electrode. The working electrode may have a reagent layer comprising a biorecognition component, specifically an enzyme having a redox active enzyme co-factor adapted to support an oxidation of the analyte in the body fluid. During catalyzing of glucose oxidation, an electrochemical reduction of the enzyme occurs. In some analyte sensors, oxygen acts as electron acceptor which is reduced by the enzyme in stoichiometric quantities to hydrogen peroxide which is diffusing away from the active center of the enzyme, becoming oxidized at the surface of the working electrode being polarized at a potential sufficient for hydrogen peroxide oxidation. In an analyte sensor in which only the glucose concentration limits the current, the flowing anodic current corresponds to an amount of hydrogen peroxide, which, in turn, is proportional to the amount of oxidized glucose. Typical working potentials applied to the working electrode are selected in a manner that the analyte sensor can vary over a considerably broad range, depending on the electrode material. By way of example, using platinum on the surface of the working electrode requires approx. 600 mV vs. an Ag/AgCl 100 mM Cl$^-$ reference electrode. Using $MnO_2$ allows decreasing the working potential up to 350 mV vs. the same kind of reference electrode.

However, the body fluid may, further, comprise additional redox active substances which may be oxidized in a similar manner, in particular by such high working potentials, and may, thus, generate further electrons which may be detectable as an additional current, also be denoted by the terms "background current" or "zero current." In general, the additional redox active substances which may be present in the body fluid and are, thus, capable of influencing this kind of measurement are usually denominated as "interferents." In a first respect, a first kind of interferents may behave in the same manner as the redox mediator and can, thus, directly be oxidized at the working electrode, thereby providing the additional current, thus, leading to an overestimated analyte concentration. In a second respect, the first kind of interferents or a second kind of interferents may react with an intermediate product, such as hydrogen peroxide ($H_2O_2$) which is present in the case of a glucose reaction, whereby the concentration of the intermediate product in the body fluid may decrease, which may result in a diminished sensitivity of the analyte sensor, thus, leading to an underestimated analyte concentration.

As a result of the presence of one or more interferents within the body fluid, measuring errors of unknown magnitude may occur due to the additional current in a glucose sensor. By way of example, in some kinds of analyte sensors, large measuring errors may particularly occur at a beginning of a measuring sequence. Similar consequences may occur during the entire operation of factory-calibrated analyte sensors, wherein fixed values are, generally, provided for the background current. Thus, an alteration of the background current may easily result in a measuring error.

Hitherto, a number of technical solutions have been provided which might be able to reduce the effect of the interferents comprised in the body fluid onto the analyte sensor.

Firstly, it has been proposed to employ a diffusion limiting membrane, i.e., a membrane which is selective to the analyte and, concurrently, provides a barrier effect to the interferent. Thus, the interferent membrane may be capable of distinguishing between the analyte and the interferent in a manner that only the analyte may reach the analyte sensor or at least the analyte detecting unit thereof. Since most known interferent membranes comprise anionic groups intended to achieve an electrostatic repulsion of anionic interferents, it is, generally, not possible to completely inhibit the effect of all interferents.

In particular, it has been proposed to apply a semipermeable layer on the surface of the electrode which is permeable for small molecules, such as hydrogen peroxide, but not for larger molecules, including most interfering substances but also glucose. On the top of this layer, the usual enzyme layer and a glucose diffusion limiting membrane are placed. As a result, the interferents can reach the enzyme layer but cannot penetrate the semi-permeable layer and can, thus, not reach the surface of the electrode. As a consequence, direct oxidation of the interferents at the electrodes surface is disabled, however the reaction of the interferents with an intermediate product may still occur.

Similarly, it has been proposed to apply an interferent scavenging layer on the top of the analyte sensor to remove interferents, in particular for analyte sensors which can be interfered by dissolved oxygen. Accordingly, a layer of glucose oxidase or pyranose oxidase is immobilized on the top of analyte layer. During detection of the analyte, which is not glucose or pyranose, portions of glucose and/or pyranose are added in order to cause the glucose oxidase and/or the pyranose oxidase to consume oxygen.

Further, it has been proposed to provide a redox mediator comprising a low working potential. Accordingly, the value of the electrical potential at which the redox mediator can be oxidized is lower than the value of the electrical potential at which an oxidation process of known interferents in body fluids occurs. However, this kind of modification typically requires an adapted concept for the operation of the analyte sensor and is, thus, in general not applicable to the existing analyte sensors. Further, only a small number of redox mediators are available which, on one hand, comprise long-term stable, non-toxic, and insoluble properties and, on the other hand, exhibit the desired low working potential.

Further, it has been proposed to determine the effect of the interferents comprised in the body fluid onto the analyte sensor. In this respect, ideas have been proposed which are related to a method of observing a dependency of the current in the analyte sensor on the applied electrical potential in order to be able to deduct the presence and/or the amount of the interferent. However, known methods tend to provide ambiguous results and are, generally, not applicable in case more than one kind of interferent may be present.

In particular, it may be feasible to eliminate an interferent signal by applying a reverse polarity of the voltage between the analyte electrode and a counter/auxiliary electrode to generate a current signal for correction. Especially, WO 2017/157894 A1 discloses a method for detecting an interferent contribution in a biosensor, wherein the biosensor has a first electrode, a second electrode, and a third electrode, wherein the first electrode and the second electrode are covered by a membrane, wherein the first electrode further includes an enzyme or wherein the first electrode is covered by an enzyme layer, wherein the first electrode, the second electrode, and the third electrode are connected via a potentiostat, wherein, in a normal operational mode, via the potentiostat an electrical potential difference is applied between the first electrode and the second electrode in a manner that the first electrode allows for oxidative processes and the third electrode allows for reductive processes, wherein the method comprises the steps of:

switching from the normal operational mode to an interferent detection mode, wherein, in the interferent detection mode, the electrical potential difference between the first electrode and the second electrode is altered for a limited period of time in a manner that the third electrode allows for oxidative processes;

measuring a current-voltage characteristic of the third electrode; and determining the interferent contribution in the biosensor by evaluating the current-voltage characteristic of the third electrode.

However, such a type of compensation is not applicable to an analyte sensor in which the working electrode can be reversibly or irreversibly damaged by the reversed voltage. For example, a $MnO_2$ anode which may be used as catalyst for hydrogen peroxide oxidation, can be reduced to another manganese species while reversely polarized. If the resulting manganese species is soluble, the working electrode can be degraded. If the reduced manganese species remains in the working electrode and it re-oxidized upon switching of the polarity back to the normal operational mode, the new kind of oxidized manganese may be different as before, thus, having different electrocatalytic properties which may result in a non-proper sensor functioning of the analyte sensor. Finally, such a kind of analyte sensor may require a long time to reach a steady state again in order to deliver a proper signal. In addition, a diffusion limiting membrane over the working electrode may prevent the applicability of this method.

As a further alternative, it may be promising to provide an interferent electrode, in particular, an additional working electrode being free of the enzyme. As a result, only the interferents, i.e., the other redox active substances within the body fluid, may, thus, be able to react with the additional working electrode. For this purpose, the additional working electrode may comprise the same set-up and may be operated at the same working potential as the first working electrode. Having identical geometries of the working electrode and the interferent electrode allows simple subtraction of the signal provided by the interferent electrode, whereby the corrected signal that corresponds to the analyte only may be obtained. Thus, using an interferent electrode allows determining the influence of the interferents at the working electrode, however the reaction of the interferents with an intermediate product as described above cannot be determined in this manner.

WO 2000/078992 A2 discloses an in vivo electrochemical sensor which comprises an interferent electrode to eliminate interferents and a working electrode to measure an analyte concentration. The two electrodes are arranged behind one another in a fashion that the interferent electrode is located in a diffusion path of a bodily fluid to the working electrode. Thus, the bodily fluid, firstly, contacts the interferent electrode to eliminate interferents. Thereafter, the bodily fluid contacts the second electrode to measure the analyte concentration essentially without interferents. However, the construction of such a kind of analyte sensor is costly since a precise design of the diffusion path is required.

SUMMARY

This disclosure teaches an analyte sensor for determining an analyte concentration in a body fluid and a method for producing an analyte sensor, which at least partially avoid the shortcomings of known analyte sensors and related methods and which at least partially address the above-mentioned challenges. The analyte sensor may allow a precise determination of the glucose concentration although interferents may be in the body fluid, wherein no additional calculation step may be required to obtain a precise glucose concentration. Further, the inventive analyte sensor may require only a simple set-up, thus, being more cost efficient.

The analyte sensor is capable of both, firstly, reducing a concentration of interferents that behave in the same manner as a redox mediator and may, thus, directly been oxidized at the working electrode, thereby providing an additional current leading to an overestimated analyte concentration and, secondly, reducing a concentration of interferents that may react with an intermediate product, thereby decreasing a concentration of the intermediate product, thus, diminishing a sensitivity of the analyte sensor, thereby leading to an underestimated analyte concentration.

In a first aspect of this disclosure, an analyte sensor for determining an analyte concentration in a body fluid is disclosed, wherein the analyte sensor comprises:
- a substrate having a first surface, the first surface being configured to be faced towards the body fluid comprising the analyte;
- a working electrode;
- an interferent electrode; and
- at least one further electrode selected from the group consisting of a counter electrode, a reference electrode and a counter/reference electrode;

wherein each of the working electrode and the interferent electrode comprises a layer of a conductive material, wherein the working electrode further comprises at least one enzyme, whereas the interferent electrode is devoid of enzyme, and wherein the interferent electrode and the working electrode are electrically separated layers located adjacently on the first surface of the substrate.

Thus, the analyte sensor as used herein allows using the interferent electrode not only to deliver an interferent signal for subtraction from the signal provided by the working electrode in order to obtain an analyte signal largely undisturbed by a presence of interferents, but significantly reduces or actively eliminates a concentration of interferents at the working electrode. As described below in more detail, the analyte sensor is, therefore, capable of both, firstly, reducing the concentration of or eliminating interferents that may otherwise directly be oxidized at the working electrode and, secondly, reducing the concentration of or eliminating interferents that may otherwise react with an intermediate product. By applying the analyte sensor as used herein, the analyte concentration can be determined in a precise fashion.

As used herein, the term "analyte sensor" refers to an arbitrary device configured for conducting at least one medical analysis. For this purpose, the analyte sensor may be an arbitrary device configured for performing at least one diagnostic purpose and, specifically, comprising at least one analyte sensor for performing the at least one medical analysis. The analyte sensor may, specifically, comprise an assembly of two or more components capable of interacting with each other, such as in order to perform one or more diagnostic purposes, such as in order to perform the medical analysis. Specifically, the two or more components may be capable of performing at least one detection of the at least one analyte in the body fluid and/or in order to contribute to the at least one detection of the at least one analyte in the body fluid. Generally, the analyte sensor may also be part of at least one of a sensor assembly, a sensor system, a sensor kit or a sensor device. Further, the analyte sensor may be connectable to an evaluation device, such as to an electronics unit.

The analyte sensor may be a fully or a partially implantable analyte sensor which may be adapted for performing the detection of the analyte in the body fluid in a subcutaneous tissue, in particular in an interstitial fluid. As used herein, the terms "implantable analyte sensor" or "transcutaneous analyte sensor" refers to an arbitrary analyte sensor being adapted to be fully or at least partly arranged within the body tissue of the patient or the user. For this purpose, the analyte sensor may comprise an insertable portion. Herein, the term "insertable portion" generally refers to a part or component of an element configured to be insertable into an arbitrary body tissue. Herein, the analyte sensor may fully or partially comprise a biocompatible surface, i.e., a surface which may have as little detrimental effects on the user, the patient, or the body tissue as possible, at least during typical durations of use. For this purpose, the insertable portion of the analyte sensor may have a biocompatible surface. By way of example, the analyte sensor, specifically the insertable portion thereof, may fully or partially be covered with at least one biocompatible membrane, such as at least one polymer membrane which, on one hand, may be permeable for the body fluid or at least for the analyte as comprised therein and which, on the other hand, retains sensor substances, such as one or more test chemicals within the sensor, thus preventing a migration thereof into the body tissue. Other parts or components of the analyte sensor may remain outside of the body tissue.

As used herein, the terms "patient" and "user" refer to a human being or an animal, independent from the fact that the human being or animal, respectively, may be in a healthy condition or may suffer from one or more diseases. As an example, the patient or the user may be a human being or an animal suffering from diabetes. However, additionally or alternatively, this disclosure may be applied to other types of users or patients or diseases.

As further used herein, the term "body fluid," generally, refers to a fluid, in particular a liquid, which is typically present in a body or a body tissue of the user or the patient and/or may be produced by the body of the user or the patient. Herein, the body fluid may, in particular, be an interstitial fluid. However, additionally or alternatively, one or more other types of body fluids may be used, such as blood, saliva, tear fluid, urine or other body fluids. During the detection of the at least one analyte, the body fluid may be present within the body or body tissue. Thus, the analyte sensor may, specifically, be configured for detecting the at least one analyte within the body tissue.

As further used herein, the term "analyte" refers to an arbitrary element, component, or compound being present in the body fluid, wherein the presence and/or the concentration of the analyte may be of interest to the user, the patient, or to a medical staff, such as to a medical doctor. In particular, the analyte may be or may comprise at least one arbitrary chemical substance or chemical compound which may participate in the metabolism of the user or the patient, such as at least one metabolite. By way of example, the at least one analyte may be selected from the group consisting of glucose, cholesterol, triglycerides, and lactate. Additionally or alternatively, however, other types of analytes may be used and/or any combination of analytes may be determined. The detection of the at least one analyte specifically may, in particular, be an analyte-specific detection. Without restricting further possible applications, this disclosure is described in the following with particular reference to a monitoring of glucose in an interstitial fluid.

Besides the analyte, the body fluid may comprise additional substances which may be present in the body fluid and may, thus, be capable of influencing the detection of the analyte in the body fluid. This kind of additional substances within the body fluid are usually denominated as "interfering substances" or "interferents." In this regard, a distinction between "endogenous interferents" and "exogenous interferents" may be made. Whereas the endogenous interferents refer to additional substances which are generally considered as being naturally produced within the body, the exogenous interferents relate to additional substances which are, generally, only present within the body after having been supplied to the body fluid from the exterior of the body. In particular, the endogenous interferents may, particularly, include uric acid or cysteine, while the exogenous interferents may particularly include pharmaceuticals and drugs, such as ascorbic acid, acetylsalicylic acid, or acetaminophen. Moreover, one or more of the following substances may, depending on the circumstances be considered as one of the interferents, substances such as compounds with an electroactive acidic, amine or sulfhydryl groups, urea, peroxides, amino acids, amino acid precursors or break-down products, nitric oxide (NO), NO-donors, NO-precursors, bilirubin, creatinine, dopamine, ephedrine, ibuprofen, L-dopa, methyl dopa, salicylate, tetracycline, tolazamide, tolbut-amide, electroactive species produced during cell metabolism and/or wound healing, and electroactive species that may arise during body pH changes. However, further kind of substances not mentioned here may also work as one of the interferents.

The analyte sensor as used herein is an electrochemical sensor. As used herein, the term "electrochemical sensor" refers to a sensor being adapted for a detection of an electrochemically detectable property of the substance, such as an electrochemical detection reaction. By way of example, the electrochemical detection reaction may be detected by applying and comparing one or more electrode potentials. Specifically, the electrochemical sensor may be adapted to generate at least one electrical sensor signal which may directly or indirectly indicate a presence and/or an extent of the electrochemical detection reaction, such as at least one current signal and/or at least one voltage signal. The measurement may be a qualitative and/or a quantitative measurement. Still, other embodiments are feasible.

For this purpose, the electrochemical sensor as used herein is arranged in a fashion of an electrochemical cell and, thus, employs at least one pair of electrodes. As used herein, the term "electrode" refers to an entity of the test element which is adapted to contact the body fluid, either directly or via at least one semi-permeable membrane or layer. Each electrode may be embodied in a fashion that an electrochemical reaction may occur at at least one surface of the electrode. In particular, the electrodes may be embodied in a manner that oxidative processes and/or reductive processes may take place at selected surfaces of the electrodes. Generally, the term "oxidative process" refers to a first chemical or biochemical reaction during which an electron is released from a first substance, such an atom, an ion, or a molecule, which is oxidized thereby. A further chemical or biochemical reaction by which a further substance may accept the released electron is, generally, denominated by the term "reductive process." Together, the first reaction and the further reaction may also be denominated as a "redox reaction." As a result, an electrical current, which relates to moving electrical charges, may be generated hereby. Herein, a detailed course of the redox reaction may be influenced by an application of an electrical potential.

Further, the electrode comprises a conductive material. As used herein, the term "conductive material" refers to a substance which is designated for conducting an electrical current through the substance. For this purpose, a highly conductive material having a low electrical resistance may be used, in particular to avoid a dissipation of electrical energy carried by the electrical current within the substance. Herein, the conductive material may be selected from a noble metal, especially gold or platinum, or a carbon material, however, further kinds of conductive materials may also be feasible.

As further used herein, the term "determining" relates to a process of generating at least one representative result, such as a plurality of representative results, which may, in particular, be acquired by evaluating at least one measurement signal, wherein the term "evaluating" may refer to an application of methods for displaying the at least one measurement signal and deriving the at least one representative result therefrom. Herein, the term "measurement signal" refers to at least one signal which characterizes an outcome of the measurement, wherein, the at least one signal may, specifically, be or comprise at least one electronic signal, such as at least one voltage signal and/or at least one current signal. The at least one signal may be or may comprise at least one analogue signal and/or may be or may comprise at least one digital signal. Especially in electrical systems, it may be required to apply a prespecified signal to a specific device in order to be able to record the desired measurement signal. By way of example, measuring a current signal may require the application of a voltage signal to the device, or vice-versa.

As further used herein, the term "monitoring" refers to a process of continuously acquiring data and deriving desired information therefrom without user interaction. For this purpose, a plurality of measurement signals are generated and evaluated, wherefrom the desired information is determined. Herein, the plurality of measurement signals may be recorded within fixed or variable time intervals or, alternatively or in addition, at an occurrence of at least one prespecified event. The analyte sensor as used herein may, especially, be configured for a continuous monitoring of one or more analytes, in particular of glucose, such as for managing, monitoring, and controlling a diabetes state.

Thus, with respect to electrode, the analyte sensor used herein comprises:
a working electrode which comprises a layer of the conductive material and an enzyme;
an interferent electrode which also comprises a layer of the conductive material but is devoid of enzyme; and
at least one further electrode which may also comprise a layer of the conductive material but being also devoid of enzyme.

Thus, the working electrode includes a biorecognition component, specifically an enzyme or is, alternatively, covered or coated by a layer of the biorecognition component, in particular, an enzyme layer, wherein the biorecognition component, in particular, the enzyme, acts here as a test chemistry, while the interferent electrode and the at least one further electrode are maintained free from the test chemistry.

Generally, the term "test chemistry" refers to an arbitrary material or a composition of materials being adapted to change at least one detectable property in the presence of the at least one analyte, wherein the detectable property is selected here from an electrochemically detectable property. Specifically, the at least one test chemistry may be a highly selective test chemistry, which only changes the property if the analyte is present in the sample of the body fluid applied to the test element, whereas no change occurs if the analyte may not be present. Herein, the degree or change of the at least one property may be dependent on the concentration of the analyte in the body fluid, in order to allow for a quantitative detection of the analyte.

As used herein, the test chemistry may comprise a biorecognition component, in particular one or more enzymes, in particular glucose oxidase (GOD) and/or glucose dehydrogenase (GDH), in particular an enzyme which, by itself and/or in combination with other components of the detector substance, is adapted to perform an oxidative process or a reductive process with the at least one analyte to be detected, in particular glucose. Additionally or alternatively, the test chemistry may comprise one or more auxiliary components, such as one or more co-enzymes and/or may comprise one or more redox mediators as mentioned above. Additionally, the test chemistry may comprise one or more dyes, which, particularly in interaction with the one or more enzymes, may change their color in the presence of the at least one analyte to be detected. Herein, the working electrode may be adapted for performing the oxidative processes. Similarly, the further electrode, in particular the counter electrode or the reference/counter electrode, may be adapted for performing the reductive processes. As a result, an analyte level, in particular a glucose level, such as the concentration of the glucose in the body fluid, may, thus, be determined by the oxidative processes at the working electrode.

The analyte sensor as used herein further comprises a substrate. As further used herein, the term "substrate," generally, refers to an arbitrary element which is designed to carry one or more other elements disposed thereon or therein. In particular, the substrate is used herein to carry the electrodes of the analyte sensor in a fashion as described elsewhere herein. By way of example, the substrate may be a flat substrate, such as a substrate having a lateral extension exceeding its thickness by at least a factor of 2, at least a factor of 5, at least a factor of 10, or even at least a factor of 20 or more. The substrate may, specifically, have an elongated shape, such as a strip shape and/or a bar shape, however, other kinds of shapes may also be feasible. The substrate may at least partially, in particular completely, comprise an electrically insulating material, especially in order to avoid unwanted currents.

The substrate as comprised by the analyte sensor as used herein has a first surface which is configured to face towards the body fluid comprising the analyte. As a result, the first surface is capable of experiencing a direct contact with the analyte comprised by the body fluid. Therefore, the first surface is designated for carrying both the working electrode and the interferent electrode which are configured to determine the desired information about the analyte concentration in the body fluid. In addition, the substrate may, further, comprise a second surface which is faced away from the first surface of the substrate. In particular, the second surface may be opposite the first surface. Herein, the second surface may be designated to be faced away from the body fluid comprising the analyte, however, depending on the actual location of the analyte sensor within the body, the second surface may be designated to be faced towards a further portion of the body fluid comprising the analyte. Herein, the at least one further electrode may be located on the second surface of the substrate.

Herein, the interferent electrode and the working electrode are electrically separated layers located adjacently on the first surface of the substrate. As used herein, the expression "located adjacently" refers to an arrangement of two individual elements in a fashion that they are closely placed with respect to each other, however, not necessarily touching each other. Herein, the interferent electrode and the working electrode, although closely located with respect to each other on the first surface of the substrate, do not touch each other but are electrically separated, wherein the expression "electrically separated" refers to a distance between adjacently located elements which is long enough in order to impede a flow of an electrical current between the adjacently located elements. In other words, the interferent electrode and the working electrode are arranged in a manner on the first side of the substrate, which is designated for experiencing a direct contact with the analyte in the body fluid, that each, the interferent electrode and the working electrode, constitutes an electrically separated layer of the conductive material, wherein an electrically conductive layer comprised by the interferent electrode is located in an adjacent fashion with respect to the electrically conductive layer comprised by the working electrode.

While the interferent electrode and the working electrode are separated from each other by a distance, both the interferent electrode and the working electrode are placed on the first side of the substrate such that the body fluid which comprises the analyte is capable of impinging both the interferent electrode and the working electrode, simultaneously or consecutively. Apart from the edges of the interferent electrode and the working electrode, the analyte in the body fluid is capable of diffusing in a planar fashion towards both the interferent electrode and the working electrode. Herein, the term "planar" describes a direction which is perpendicular to both an extension of the first surface of the substrate. As used herein, the term "perpendicular" refers to a value of 90° but may also include a deviation of ±15°, of ±5°, of ±1°, from the perpendicular arrangement. Furthermore, the diffusion at the edges of the interferent electrode and the working electrode may assume a so-called "circular" form, wherein a so-denoted "hemispherical" diffusion towards at least one small point located on at least one of the edges may also occur.

Thus, a reduction or an elimination of interferents may occur in a region above the surface of the working electrode as follows. As described above, the working electrode comprises enzyme which is configured for specific oxidation of the analyte. Therefore, both specific analyte oxidation and unspecific interferent oxidation can, simultaneously or consecutively, occur at the surface of the working electrode. In contrast hereto, the interferent electrode does not comprise the enzyme for specific analyte oxidation. For glucose, no analyte but only interferents can be oxidized at the interferent electrode under normal operating conditions. Since the interferent electrode is configured to efficiently consume interferents, the concentration of the interferents is, therefore, reduced in the region above the interferent electrode. Since the working electrode is located adjacently with respect to the interferent electrode, the region above the working electrode is depleted from the interferents. As a result, no additional current that may be caused by the interferents can be generated at the working electrode. Thus, the analyte sensor is capable of reducing the concentration of the interferents that may otherwise be oxidized at the working electrode. In addition, at least one intermediate product, which can be generated by the specific analyte oxidation on the surface of the working electrode, may be present in the region above the working electrode. However, since the region above the working electrode is depleted from the interferents, no or nearly no interferents are still present that may be capable of reacting with the at least one intermediate product in the region above the working electrode. As a result, nearly all or, in particular, all of the intermediate product can contribute to the generation of the measurement signal at the working electrode. Thus, a more accurate measurement signal at the working electrode can be used for precisely determining the analyte concentration despite the interferents comprised by the body fluid by using the analyte sensor as used herein.

Further, the working electrode may occupy a first portion of the first surface whereas the interferent electrode may occupy a second portion of the first surface. As used herein, the terms "first" and "second" are considered as description without specifying an order and without excluding a possibility that other elements of that kind may be present. As further used herein, the term "portion" refers to a fraction of the first surface on which the respective electrode may be placed. Herein, the second portion comprising the interferent electrode may at least partially, in particular completely, surround the first portion which comprises the working electrode. As further used herein, the term "surround" and grammatical variations thereof refers to an arrangement of two elements in which a first element having a first border is located on a substrate in a fashion in which the first border is predominantly, in particular completely, enclosed by a second element. As used herein, the term "predominant" refers to a fraction which exceeds an amount of all other fractions. By way of example, the second portion comprising the interferent electrode may completely surround the first portion comprising the working electrode apart from a region which is designated for providing electrical connection of the working electrode. As an alternative example, the second portion comprising the interferent electrode may completely surround the first portion comprising the working electrode, in which event the electrical connection of the working electrode could be provided through the substrate. This arrangement may, especially, enable the interferent electrode to be adjacently located with respect to a predominant fraction of a border, in particular of the complete border, of the working electrode, thus, improving the effect of reducing the concentration of the interferent or of eliminating the interferent from the working electrode. In other words, an interferent electrode which is located to surround the working electrode is more efficient in terms of interferent reduction or elimination compared to an interferent electrode which only adjoins a non-predominant fraction of the border of the working electrode.

Further, the analyte sensor as used herein may further comprise a diffusion limiting membrane at least covering the working electrode. As used herein, the term "diffusion limiting membrane" refers to a thin layer which is limiting the diffusion speed of the analyte towards the at last one working electrode. Further, the diffusion limiting membrane may be capable of diminishing an amount of the interferent that may reach the analyte sensor. For this purpose, the diffusion limiting membrane may be covering the working electrode, or both the working electrode and the interferent electrode. Herein, the diffusion limiting membrane may exhibit a thickness which may exceed a diameter of the working electrode. In particular, the thickness of the diffusion limiting membrane may be 20 µm to 50 µm, 25 µm to 40 µm, in particular around 30 µm.

Herein, the electrically separated layers of the working electrode and of the interferent electrode may be separated from each other by a distance of 0.5 to 2.0, of 0.8 to 1.2, in particular around 1.0, of the thickness of the diffusion limiting membrane. This kind of arrangement may, especially, contribute to the above-mentioned depletion of the region above the working electrode from the interferents, such that no or nearly no interferents are still present that may be capable of reacting with the at least one intermediate product in the region above the working electrode, thereby enabling nearly all or, in particular, all of the intermediate product to contribute to the generation of the measurement signal at the working electrode.

As already mentioned above, the course of the redox reaction which may occur in the analyte sensor may be influenced by application of an electrical potential. Thus, the detailed course of the redox reaction may be detected by comparing one or more electrode potentials, in particular an electrical potential difference between the working electrode or the interferent electrode on one hand and the further electrode, in particular the counter electrode or the counter/reference electrode, on the other hand. For this purpose, the working electrode, the interferent electrode, and the further electrode of the analyte sensor are connected via a potentiostat. As used herein, the term "potentiostat" refers to an electronic device which is adapted for adjusting and/or measuring the electrical potential difference between the working electrode or the interferent electrode and the further electrode, in particular the counter electrode or the counter/reference electrode, in the electrochemical cell. Alternatively or in addition, a galvanostatic method may be used. For this purpose, a galvanostat may be employed, wherein the term "galvanostat" refers to a control and measuring device being capable of maintaining the current through the electrochemical cell constant.

Further, the interferent electrode may be operable at the same electrical potential or approximately the same electrical potential which is applied to the working electrode. Applying a considerably higher electrical potential to the interferent electrode compared to the working electrode may result in removing substances which are not capable of disturbing the working potential of the working electrode. As a result, it is advantageous to apply an electrical potential to the interferent electrode which may exceed the electrical potential of the working electrode by 50 mV to 100 mV, whereby a kinetics of the processes at the interferent electrode can be improved.

In a further aspect of this disclosure, a method for producing an analyte sensor, in particular for producing the analyte sensor as described herein, is disclosed, wherein the analyte sensor is configured for determining an analyte concentration in a body fluid. The method comprises the following steps of:
  a) applying a layer of a conductive material to a first surface of a substrate, the first surface being configured to be faced towards the body fluid comprising the analyte, in a manner that two electrically separated layers are obtained in a first portion of the surface of the substrate and a second portion of the surface of the substrate;
  b) further applying a layer of a composition comprising an enzyme onto the conductive material in a manner that a working electrode is formed on the first portion covered by the composition comprising the enzyme and that an interferent electrode is formed on the second portion being devoid of the composition comprising the enzyme; and c) forming at least one further electrode selected from the group consisting of a counter electrode, a reference electrode and a counter/reference electrode on the substrate.

Herein, the indicated steps may be performed in the given order, hereby starting with step a) and commencing with step b). However, in particular step c), can be performed independent from steps a) and b), such as prior to or after step a) or step b). Additionally, the indicated steps, in particular step c), may be repeated several times in order to form more than one electrode. Further, additional steps, whether described herein or not, may be performed, too.

Herein, step a) may comprise applying a first individual layer of the conductive material onto the first portion and a second individual layer of the conductive material onto the second portion in a manner that the first portion and the second portion are electrically separated from each other. As an alternative, step a) may comprise applying the layer of the conductive material onto the first surface and removing the conductive material between the first portion and the second portion, by which removing the respective conductive layers for the working electrode and for the interferent electrode may be generated. As used herein, the term "removing" refers to a subtractive technique by which a partition of the conductive material is deleted from the first surface. For this purpose, the subtractive technique can be selected from laser ablation or selective etching.

Further, step b) may comprise further applying a layer of a composition comprising the enzyme onto the conductive material on the first portion in a manner that the conductive material on the second portion is maintained devoid of the composition comprising the enzyme. As used herein, the term "composition" refers to a mixture comprising at least two substances, wherein a first substance is the enzyme which is introduced into a second substance employed as a carrier substance, for which purpose a polymer may be used. However, other kinds of carrier substances may also be feasible.

As an alternative, step b) may comprise further applying the layer of the composition comprising the enzyme onto the conductive material, subsequently removing the composition comprising the enzyme from the second portion and maintaining the composition comprising the enzyme on the first portion. Again, a subtractive technique by which a partition of the composition comprising the enzyme can be removed from the layer of the conductive material within the second portion can be used, especially selected from laser ablation or selective etching.

Further, step c) may comprise applying a second layer of the conductive material to the second surface of a substrate, wherein the second surface is faced away from the first surface of the substrate. Herein, the further electrode which may be selected from the group consisting of a counter electrode, a reference electrode and a counter/reference electrode can, thus, be generated on the second surface of the substrate.

For further details with regard to the method, reference can be made to the description of the analyte sensor above or below.

The analyte sensor and the related methods as disclosed herein exhibit various advantages with respect to the prior art. Advantageously, the analyte sensor allows a precise determination of the glucose concentration although interferents may be comprised by the bodily fluid. In contrast to methods in which a second working electrode is used, no additional calculation step, such as by subtracting the current of the second working electrode from the current of the working electrode, is needed for obtaining a precise glucose concentration. No additional membrane which may limit the diffusion of the interferents is required, resulting in a less complicated and, thus, more cost efficient analyte sensor.

Moreover, the present method may not only be applicable for reducing the influence of endogenous interferents, in particular of uric acid or cysteine, on the determination of the analyte level, especially the glucose level, in the body fluid, but also the influence of exogenous interferents, in particular pharmaceuticals and drugs, such as ascorbic acid, acetylsalicylic acid, and/or acetaminophen which can exert a considerable influence on the analyte level, in particular on the glucose level, in the body fluid. This additional opportunity may, thus, be used for an improved managing, monitoring, and controlling of the diabetes state, specifically of a multi-morbid patient who suffers from further diseases apart from diabetes and, thus, requires further medication.

As used herein, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. Herein, in most cases, when referring to the respective feature or element, the expressions "at least one" or "one or more" will not be repeated, non-withstanding the fact that the respective feature or element may be present once or more than once.

Further, as used herein, the terms "particularly," "specifically," or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

Summarizing, the following embodiments are potential embodiments of this disclosure. Other embodiments, however, are feasible.

Embodiment 1: An analyte sensor for determining an analyte concentration in a body fluid, comprising:
   a substrate having a first surface, the first surface being configured to be faced towards the body fluid comprising the analyte;
   a working electrode;
   an interferent electrode; and at least one further electrode selected from the group consisting of a counter electrode, a reference electrode and a counter/reference electrode;

wherein each of the working electrode and the interferent electrode comprises a layer of a conductive material, wherein the working electrode further comprises at least one enzyme, whereas the interferent electrode is devoid of enzyme, and wherein the interferent electrode and the working electrode are electrically separated layers located adjacently on the first surface of the substrate.

Embodiment 2: The analyte sensor according to the preceding Embodiment, wherein the working electrode occupies a first portion of the first surface.

Embodiment 3: The analyte sensor according to any one of the preceding Embodiments, wherein the interferent electrode occupies a second portion of the first surface.

Embodiment 4: The analyte sensor according to any one of the two preceding Embodiments, wherein the second portion at least partially surrounds the first portion.

Embodiment 5: The analyte sensor according to any one of the preceding Embodiments, wherein the substrate further has a second surface, the second surface being faced away from the first surface of the substrate.

Embodiment 6: The analyte sensor according to any one of the preceding Embodiments, wherein the at least one further electrode is located on the second surface of the substrate.

Embodiment 7: The analyte sensor according to any one of the preceding Embodiments, further comprising a diffusion limiting membrane.

Embodiment 8: The analyte sensor according to the preceding Embodiment, wherein the diffusion limiting membrane is covering at least the working electrode.

Embodiment 9: The analyte sensor according to any one of the two preceding Embodiments, wherein the diffusion limiting membrane is covering both the working electrode and the interferent electrode.

Embodiment 10: The analyte sensor according to any one of the preceding Embodiments, wherein a thickness of the diffusion limiting membrane exceeds a diameter of the working electrode.

Embodiment 11: The analyte sensor according to the preceding Embodiment, wherein the thickness of the diffusion limiting membrane is 20 µm to 50 µm, 25 µm to 40 µm, in particular around 30 µm.

Embodiment 12: The analyte sensor according to any one of the preceding Embodiments, wherein the electrically separated layers of the working electrode and of the interferent electrode are separated from each other by a distance.

Embodiment 13: The analyte sensor according to the preceding Embodiment, wherein the distance is 0.5 to 2.0, 0.8 to 1.2, in particular around 1.0, of the thickness of the diffusion limiting membrane.

Embodiment 14: The analyte sensor according to any one of the preceding Embodiments, wherein the interferent electrode is operable at a same potential applied to the working electrode.

Embodiment 15: The analyte sensor according to any one of the preceding Embodiments, wherein the analyte sensor is a fully implantable analyte sensor or a partially implantable analyte sensor.

Embodiment 16: The analyte sensor according to any one of the preceding Embodiments, wherein the analyte sensor is an analyte sensor for continuously monitoring an analyte.

Embodiment 17: The analyte sensor according to any one of the preceding Embodiments, wherein the analyte sensor is an analyte sensor for a continuous measurement of the analyte in a subcutaneous tissue.

Embodiment 18: The analyte sensor according to any one of the preceding Embodiments, wherein the analyte sensor is an analyte sensor for a continuous measurement of the analyte in a body fluid.

Embodiment 19: The analyte sensor according to the preceding Embodiment, wherein the analyte sensor is an analyte sensor for a continuous measurement of the analyte in an interstitial fluid.

Embodiment 20: The analyte sensor according to any one of the preceding Embodiments, wherein the analyte comprises glucose.

Embodiment 21: The analyte sensor according to any one of the preceding Embodiments, wherein the enzyme is at least one of glucose oxidase or glucose dehydrogenase.

Embodiment 22: The analyte sensor according to any one of the preceding Embodiments, wherein the interferent is one of an endogenous interferent and an exogenous interferent, wherein the interferent is capable of affecting a level of the analyte, in particular, the interferent is capable of affecting the measured level of the analyte.

Embodiment 23: The analyte sensor according to the preceding Embodiment, wherein the endogenous interferent is uric acid.

Embodiment 24: The analyte sensor according to any one of the two preceding Embodiments, wherein the exogenous interferent is a pharmaceutical compound and/or a metabolic product thereof.

Embodiment 25: The analyte sensor according to any one of the two preceding Embodiments, wherein the exogenous interferent is at least one of one of ascorbic acid, acetylsalicylic acid, and acetaminophen.

Embodiment 26: A method for producing the analyte sensor, wherein the analyte sensor is configured for determining an analyte concentration in a body fluid, the method comprising the steps of:

a) applying a layer of a conductive material to a first surface of a substrate, the first surface being configured to be faced towards the body fluid comprising the analyte, in a manner that two electrically separated layers are obtained in a first portion of the surface of the substrate and a second portion of the surface of the substrate;

b) further applying a layer of a composition comprising an enzyme onto the conductive material in a manner that a working electrode is formed on the first portion covered by the composition comprising the enzyme and that an interferent electrode is formed on the second portion being devoid of the composition comprising the enzyme;

c) forming at least one further electrode selected from the group consisting of a counter electrode, a reference electrode and a counter/reference electrode on the substrate.

Embodiment 27: The method according to the preceding Embodiment, wherein the method is for producing the analyte sensor according to any one of the preceding Embodiments referring to an analyte sensor.

Embodiment 28: The method according to any one of the preceding Embodiments referring to a method, wherein step a) comprises applying a first individual layer of the conductive material onto the first portion and a second individual layer of the conductive material onto the second portion in a manner that the first portion and the second portion are electrically separated from each other.

Embodiment 29: The method according to any one of the preceding Embodiments referring to a method, wherein step a) comprises applying the layer of the conductive material onto the first surface and removing the conductive material between the first portion and the second portion.

Embodiment 30: The method according to any one of the preceding Embodiments referring to a method, wherein step b) comprises further applying the layer of the composition comprising the enzyme onto the conductive material on the first portion in a manner that the conductive material on the second portion is maintained devoid of the composition comprising the enzyme.

Embodiment 31: The method according to any one of the preceding Embodiments referring to a method, wherein step b) comprises further applying the layer of the composition comprising the enzyme onto the conductive material, subsequently removing the composition comprising the enzyme from the second portion and maintaining the composition comprising the enzyme on the first portion.

Embodiment 32: The method according to any one of the preceding Embodiments referring to a method, wherein step c) comprises applying a second layer of the conductive material to a second surface of the substrate, the second surface being faced away from the first surface of the substrate.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
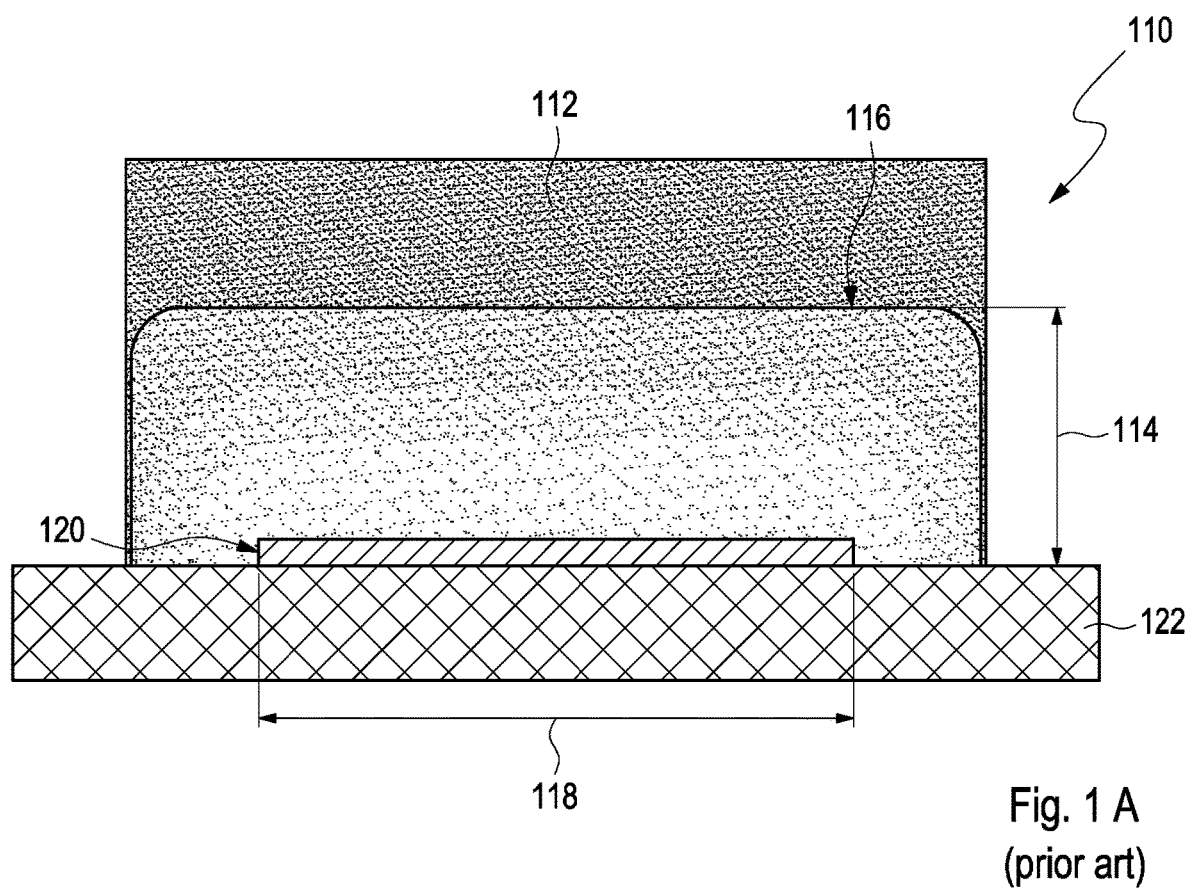
FIGS. 1A and 1B schematically illustrates illustrate a cross-sectional view of a prior art analyte sensor in which a membrane thickness exceeds an electrode width (FIG. 1A) or is comparable with the electrode width (FIG. 1B)
Figure 1:
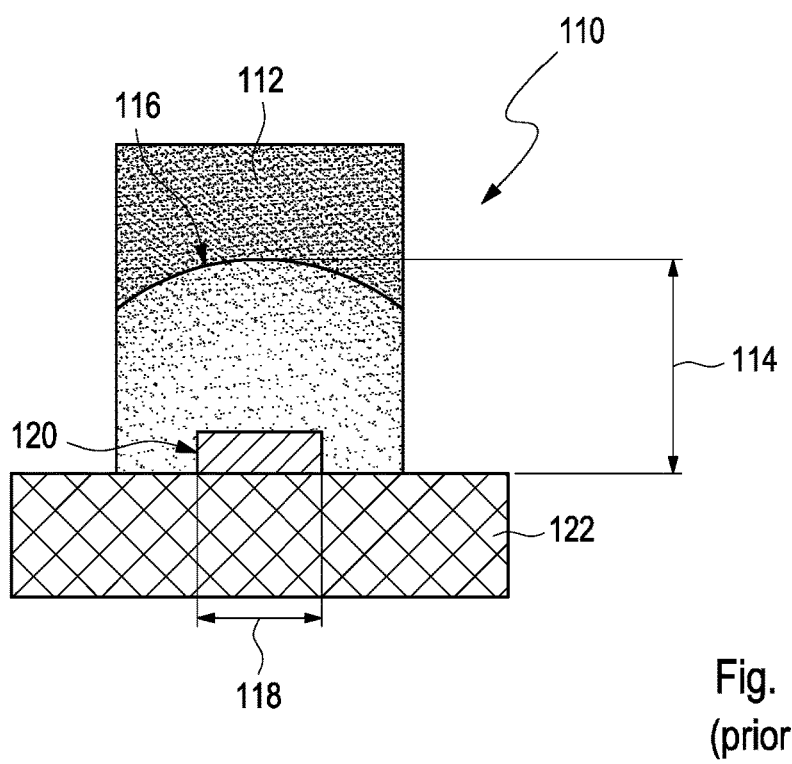

FIG. 1A schematically illustrates a cross-sectional view of a prior art analyte sensor 110 for determining an analyte concentration in a body fluid 112 in which a thickness 114 of a membrane 116 coating the prior art analyte sensor 110 exceeds a width 118 of a working electrode 120 located on a substrate 122. As further depicted there, a concentration of the analyte is indicated by a density of dots. Outside the membrane 116 the glucose concentration is fixed and corresponds to a glucose concentration value in the body fluid 112. As the glucose penetrates deeper into the membrane 116, its concentration decreases more and more, in particular since the membrane 116 limits a diffusion of the glucose while the working electrode 120 consumes the glucose as described above in more detail. In the case as illustrated in FIG. 1A in which the width 118 of the working electrode 120 exceeds the thickness 114 of the membrane 116, a diffusion profile of the glucose can, by ignoring edge effects, be considered as planar. However, as depicted in FIG. 1B, the diffusion profile becomes semispherical in a case in which the width 118 of the working electrode 120 becomes comparable to the thickness 114 of the membrane 116. The same observations as illustrated in FIGS. 1A and 1B are applicable to any other compounds, such as to one or more interferents, once the membrane 116 limits the diffusion thereof and as long as the working electrode 120 is capable of consuming them.

An analyte sensor 130 for determining an analyte concentration in a body fluid 132 as disclosed herein, which can be used as a fully or partially implantable analyte sensor for continuously monitoring an analyte, is schematically illustrated in a cross-sectional view in FIG. 2A and in an enlarged top view in FIG. 2B. As indicated above, this disclosure is described herein with reference to glucose without restricting further possible applications. In this example in which the analyte comprises glucose, an enzyme selected from least one of glucose oxidase (GOD) or glucose dehydrogenase (GDH) can be used as biorecognition component for determining the analyte concentration.

As depicted in FIG. 2A, the analyte sensor 130 comprises a substrate 134 which has a first surface 136, wherein the first surface 136 is configured to be faced towards the body fluid 132 which comprises the analyte. As a result, the first surface 136 of the substrate 134 is capable of experiencing a direct contact with the analyte comprised by the body fluid 132. As further depicted in FIG. 2A, the substrate 134 may, in addition, comprise a second surface 138 which is faced away from the first surface 136 of the substrate 134. The substrate 134 is designated to carry electrodes of the analyte sensor 130 in a particular fashion which is described below in more detail. Especially in order to avoid unwanted currents, the substrate 136 may at least partially, in particular completely, comprise at least one electrically insulating material.

Figure 2:
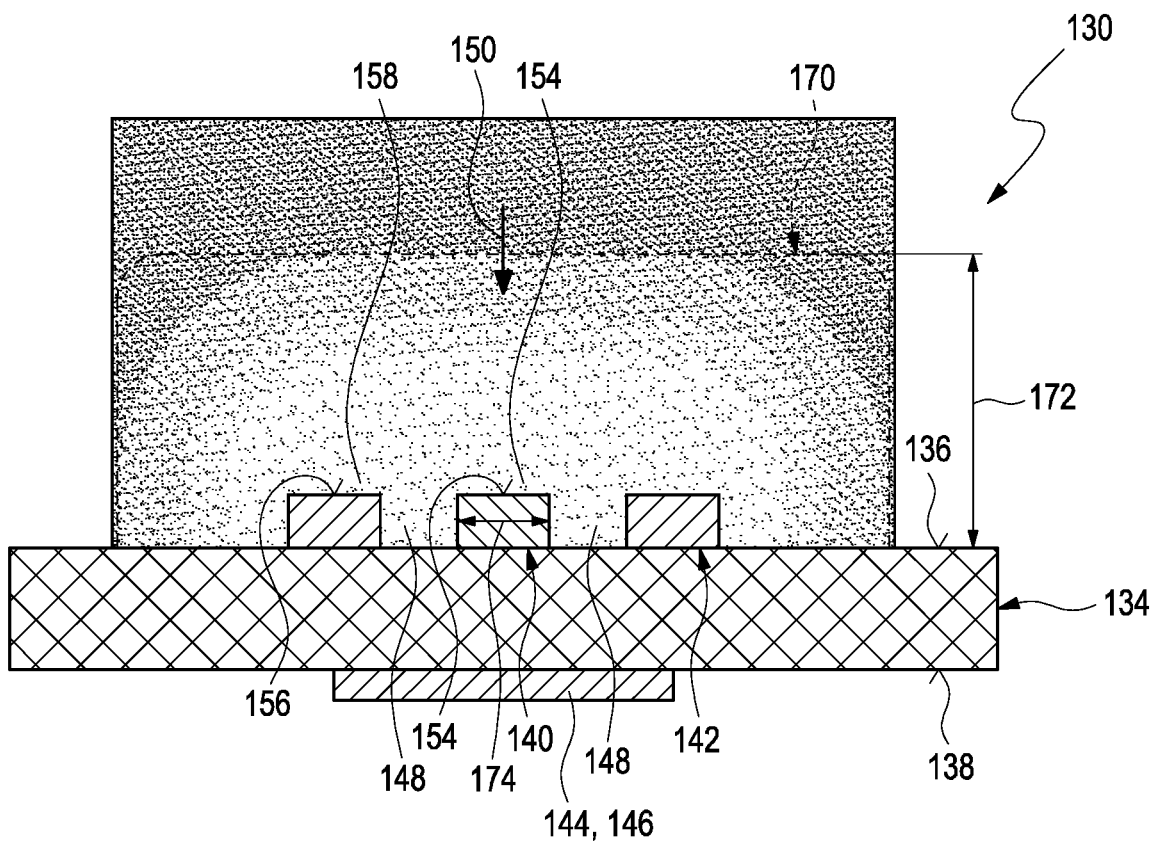
FIG. 2A schematically illustrates a cross-sectional view and FIG. 2B illustrates an enlarged top view of an analyte sensor as disclosed herein.
Figure 2:
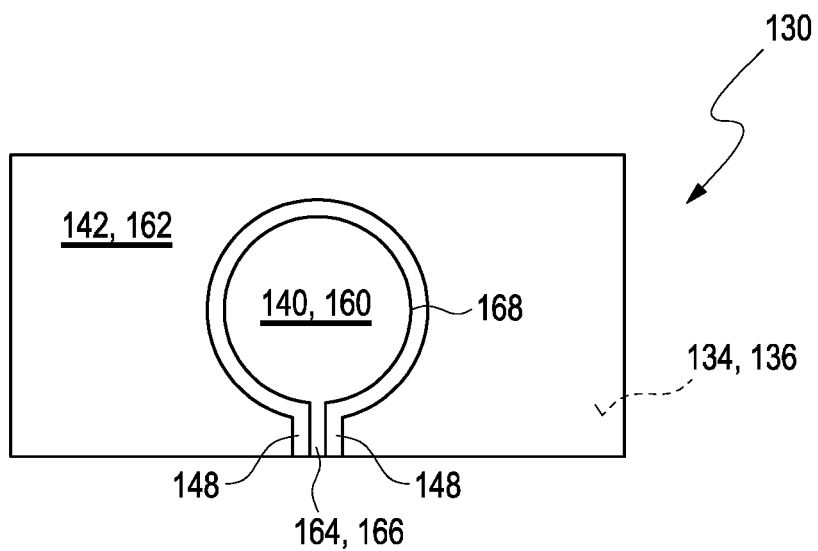

As further illustrated in FIG. 2, the first surface 136 of the substrate 134 which is capable of experiencing the direct contact with the analyte as comprised by the body fluid 132 carries both a working electrode 140 and an interferent electrode 142 which are configured to determine desired information about an analyte concentration in the body fluid 132. As further illustrated in FIG. 2, the second surface 138 carries the at least one further electrode 144, in particular a counter electrode 146, however, a counter/reference electrode or a reference electrode may also be feasible (not depicted here).

Thus, the working electrode 140 and the interferent electrode 142 are electrically separated layers which are located adjacently on the first surface 136 of the substrate 134. As a result, they are closely placed with respect to each other, however, do not touch each other. Rather, the interferent electrode 142 surrounds the working electrode 140 as depicted in FIG. 2B, wherein each of the working electrode 140 and the interferent electrode 142 constitutes an individual layer of a conductive material placed on the first surface 136 of the substrate 134 but electrically separated by a distance 148 between the working electrode 140 and the interferent electrode 142. While the working electrode 140 and the interferent electrode 142 are separated from each other by the distance 148, both the working electrode 140 and the interferent electrode 142 are placed on the first side 136 of the substrate 134 in a fashion that the body fluid 132 comprising the analyte can impinge both the working electrode 140 and the interferent electrode 142, in a simultaneous or consecutive manner. Therefore, the analyte which is comprised by the body fluid 132 can exert a vertical diffusion in a direct as indicated in FIG. 2A by the arrow 150 towards both the working electrode 140 and the interferent electrode 142.

As a result, a reduction or an elimination of interferents may occur in a region 152 above a surface 154 of the working electrode 140 as follows. Since the working electrode 140 comprises enzyme (not depicted here) which is configured for a specific oxidation of the analyte, both specific oxidation of the analyte and unspecific oxidation of the interferent can, simultaneously or consecutively, occur at the surface 154 of the working electrode 140. In contrast hereto, the interferent electrode 142 does not comprise the enzyme for the specific oxidation of the analyte. Therefore, only interferents but no analyte can be oxidized at a surface 156 of the interferent electrode 142 under normal operating conditions. Since the interferent electrode 142 is configured to efficiently consume interferents, the concentration of the interferents is, therefore, reduced in a region 158 above the interferent electrode. Since the working electrode 140 is located in an adjacent fashion with respect to the interferent electrode 142, the region 152 above the working electrode 140 is depleted from the interferents. As a result, no additional current which may be caused by the interferents can be generated at the working electrode 140. Thus, the analyte sensor 130 as disclosed herein is, thus, capable of reducing the concentration of the interferents that may otherwise be oxidized at the working electrode 140.

In addition, at least one intermediate product, which can be generated by the specific oxidation of the analyte on the surface 154 of the working electrode 140, can be present in the region 152 above the working electrode. However, since the region 152 above the working electrode 140 is depleted from the interferents, no or nearly no interferents are still present that may be capable of reacting with the at least one intermediate product in the region 152 above the working electrode 140. As a result, nearly all or, in particular, all of the intermediate product can contribute to the generation of the measurement signal at the working electrode 140. Thus, the analyte sensor 130 as disclosed herein allows acquiring a more accurate measurement signal at the working electrode 140 which can be used for precisely determining the analyte concentration in the body fluid 132 although the bodily fluid 132 by further comprises the interferents.

In the arrangement as depicted in FIG. 2B, the working electrode 140 occupies a first portion 160 of the first surface 136 while the interferent electrode 142 occupies a second portion 162 of the first surface 136, wherein the second portion 162 comprising the interferent electrode 142 completely surrounds the first portion 160 comprising the working electrode 140 apart from a region 164 which is designated for providing electrical connection 166 of the working electrode 140. This arrangement may, especially, enable the interferent electrode 142 to be adjacently located with respect to a predominant fraction of a border 168 of the working electrode 140, thus, improving the effect of reducing the concentration of or of eliminating, the interferent from the working electrode 140.

As depicted in FIG. 2, the interferent electrode 142 may only act as an interferent removal electrode, such that an oxidation current from the interferent electrode 142 may not be considered when determining the analyte concentration. Measuring the oxidation current provided by the interferent electrode 142 is, generally, not required, in particular when the interferent removal is sufficiently efficient. However, in a case in which the interferent removal may be kinetically limited, a working potential of the interferent electrode 142 may be increased, whereby an improvement may be achieved. Once the interferent removal efficiency is not sufficient, a surface area and the interferent current can be considered for a determination of an interferent concentration and, therefore, for a correction of the measurement signal as provided by the working electrode 140.

Herein, the analyte sensor 130 as disclosed herein may, further comprise a diffusion limiting membrane 170, which may, as depicted in FIG. 2A, coat both the working electrode 140 and the interferent electrode 142. Herein, a thickness 172 of the diffusion limiting membrane 168 may, especially, be 20 µm to 50 µm, 25 µm to 40 µm, in particular around 30 µm, and may, thus, exceed a diameter 174 of the working electrode 140. Further, the distance between 148 the electrically separated layers of the working electrode 140 and of the interferent electrode are 142 as depicted in FIG. 2 may be 0.5 to 2.0, 0.8 to 1.2, in particular around 1.0, of the thickness of the diffusion limiting membrane 170.

Figure 3:
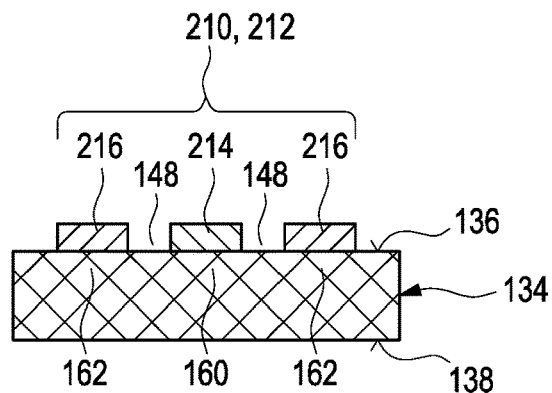
FIGS. 3A-3G are a series of cross-sectional views that illustrate a method for producing an analyte sensor.
Figure 3:
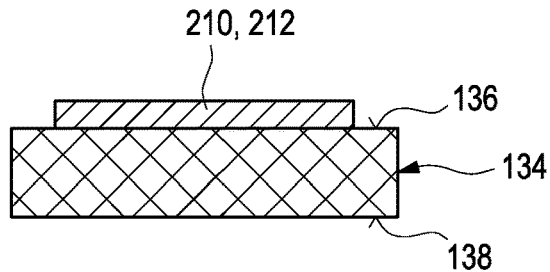
Figure 3:
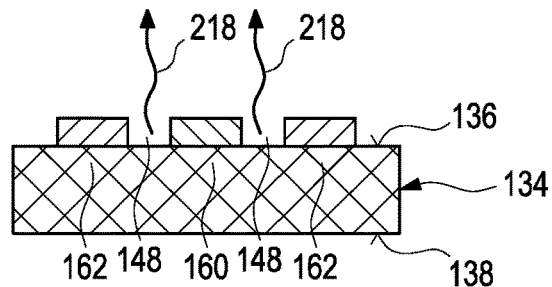
Figure 3:
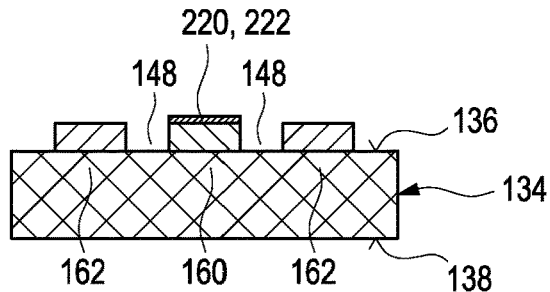
Figure 3:
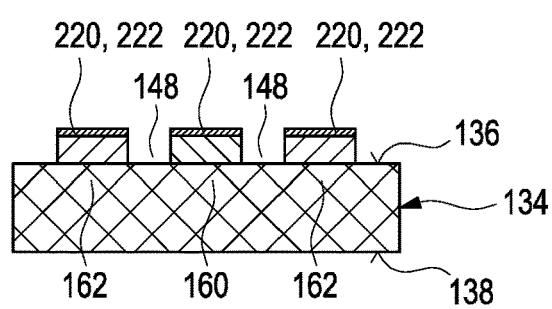
Figure 3:
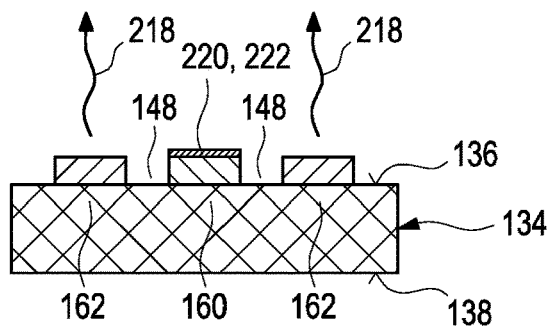
Figure 3:
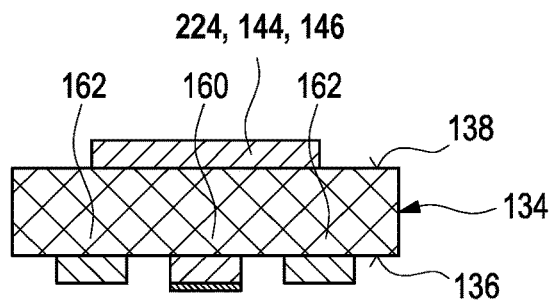

FIG. 3 schematically illustrates a method for producing the analyte sensor 130 in a series of cross-sectional views in FIGS. 3A to 3G.

According to step a), a layer 210 of a conductive material 212 is applied to the first surface 136 of the substrate 134, wherein the first surface 136 is configured to be faced towards the body fluid 132 comprising the analyte, in a manner that two electrically separated layers are obtained in the first portion 160 and the second portion 162 of the first surface 136 of the substrate 134.

As illustrated in FIG. 3A, step a) may comprise applying a first individual layer 214 of the conductive material 212 onto the first portion 160 and a second individual layer 216 of the conductive material 212 onto the second portion 162 in a manner that the first portion 160 and the second portion 162 are electrically separated from each other by the distance 148.

As illustrated in FIGS. 3B and 3C, step a) may, alternatively, comprise applying the layer 210 of the conductive material 212 onto the first surface 136 and removing the conductive material 212 between the first portion 160 and the second portion 162 within the distance 148, in particular by laser ablation 218.

According to step b), a layer 220 of a composition 222 comprising an enzyme onto the conductive material 212 in a manner that the working electrode 140 is formed on the first portion 160 covered by the composition 222 comprising the enzyme and that the interferent electrode 142 is formed on the second portion 162 which is devoid of the composition 222 comprising the enzyme.

As illustrated in FIG. 3D, step b) may comprise applying the layer 220 of the composition 222 comprising the enzyme onto the conductive material 212 on the first portion 160 in a manner that the conductive material 212 on the second portion 162 is maintained devoid of the composition 222 comprising the enzyme.

As illustrated in FIGS. 3E and 3F, step b) may, alternatively, comprise applying the layer 220 of the composition 222 comprising the enzyme onto the conductive material 212, whereby the composition 222 comprising the enzyme is subsequently removed from the second portion 162 and maintained on the first portion 160, in particular by using the laser ablation 218 again.

As illustrated in FIG. 3G, step c) comprises forming the least one further electrode 144, in particular the counter electrode 146, the counter/reference electrode or the reference electrode on the substrate 134, in particular by applying a second layer 224 of the conductive material 212 to the second surface 138 of the substrate 134, the second surface 138 being faced away from the first surface 136 of the substrate 134.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS

- 110 Prior art analyte sensor
- 112 Body fluid
- 114 Thickness
- 116 Membrane
- 118 Width
- 120 Working electrode
- 122 Substrate
- 130 Analyte sensor
- 132 Body fluid
- 134 Substrate
- 136 First surface
- 138 Second surface
- 140 Working electrode
- 142 Interferent electrode
- 144 Further electrode
- 146 Counter electrode
- 148 Distance
- 150 Arrow
- 152 Region above the working electrode
- 154 Surface of the working electrode
- 156 Surface of the interferent electrode
- 158 Region above the interferent electrode
- 160 First portion
- 162 Second portion
- 164 Region provided for electrical connection
- 166 Electrical connection
- 168 Border
- 170 Diffusion limiting membrane
- 172 Thickness
- 174 Diameter
- 210 Layer
- 212 Conductive Material
- 214 First individual layer
- 216 Second individual layer
- 218 Laser ablation
- 220 Layer
- 222 Composition comprising enzyme
- 224 Second Layer

What is claimed is:

1. A fully or partially implantable analyte sensor for continuously monitoring analyte concentration in a body fluid, the sensor comprising:
   a substrate having a first surface configured to face towards the body fluid;
   a working electrode;
   an interferent electrode, wherein the interferent electrode and the working electrode are electrically separated and located adjacently on the first surface; and
   a further electrode selected from the group consisting of a counter electrode, a reference electrode and a counter/reference electrode;
   wherein (i) the working electrode and the interferent electrode each have a layer of a conductive material, (ii) the working electrode further comprises a composition having an enzyme and a carrier, and (iii) the interferent electrode is devoid of the enzyme and the carrier; and
   wherein the working electrode is surrounded by the interferent electrode to the extent sufficient to cause the interferents reacting with the working electrode to be reduced such that additional calculations of the interferent current are not necessary to determine the analyte concentration.

2. The analyte sensor according to claim 1, wherein the substrate has a second surface facing away from the first surface, wherein the further electrode is located on the second surface of the substrate.

3. The analyte sensor according to claim 1, further comprising a diffusion limiting membrane covering at least the working electrode.

4. The analyte sensor according to claim 3, wherein the diffusion limiting membrane covers both the working electrode and the interferent electrode.

5. The analyte sensor according to claim 3, wherein a thickness of the diffusion limiting membrane exceeds a diameter of the working electrode.

6. The analyte sensor according to claim 5, wherein the thickness of the diffusion limiting membrane is in the range of 20 µm to 50 µm.

7. The analyte sensor according to claim 3, wherein the working electrode and the interferent electrode are separated from each other by a distance in the range of 0.5 to 2.0 times the thickness of the diffusion limiting membrane.

8. The analyte sensor according to claim 1, wherein the interferent electrode is operable at the same potential applied to the working electrode.

9. The analyte sensor according to claim 1, wherein the analyte comprises glucose and the enzyme is at least one of glucose oxidase or glucose dehydrogenase.

10. The implantable sensor according to claim 1, wherein the interferent electrode substantially surrounds the working electrode.

11. A method for producing a fully or partially implantable analyte sensor for continuously monitoring analyte concentration in a body fluid, the method comprising:
   a) applying a layer of a conductive material to a first surface of a substrate, the first surface being configured to face towards a body fluid, wherein the layer is applied so that two electrically separated layers located adjacent to one another are obtained in a first portion of the first surface and a second portion of the first surface, respectively;
   b) applying onto the conductive material a layer of a composition comprising an enzyme and a carrier such that a working electrode is formed on the first portion covered by the composition and an interferent electrode is formed on the second portion and the interferent electrode is devoid of the enzyme and the carrier, wherein the working electrode is surrounded by the interferent electrode to the extent sufficient to cause the interferents reacting with the working electrode to be reduced such that additional calculations of the interferent current are not necessary to determine the analyte concentration; and
   c) forming on the substrate at least one further electrode selected from the group consisting of a counter electrode, a reference electrode and a counter/reference electrode.

12. The method according to claim 11, wherein step a) comprises:
- applying a first individual layer of the conductive material onto the first portion and a second individual layer of the conductive material onto the second portion such that the first portion and the second portion are electrically separated from each other; or
- applying the layer of the conductive material onto the first surface and removing the conductive material between the first portion and the second portion.

13. The method according to claim 11, wherein step b) comprises:
- further applying onto the conductive material the layer of the composition on the first portion in a manner that the conductive material on the second portion is maintained devoid of the composition comprising the enzyme; or
- further applying onto the conductive material the layer of the composition comprising the enzyme onto the conductive material, subsequently removing the composition comprising the enzyme from the second portion and maintaining the composition comprising the enzyme on the first portion.

14. The method according to claim 11, wherein step c) comprises applying a second layer of the conductive material to a second surface of the substrate, the second surface facing away from the first surface.

15. The method according to claim 11, wherein the interferent electrode substantially surrounds the working electrode.

16. A fully or partially implantable analyte sensor for continuously monitoring analyte concentration in a body fluid, the sensor comprising:
- a substrate having a first surface configured to face towards the body fluid;
- a working electrode;
- an interferent electrode, wherein the interferent electrode and the working electrode are electrically separated and located adjacently on the first surface; and
- a further electrode selected from the group consisting of a counter electrode, a reference electrode and a counter/reference electrode;
- wherein (i) the working electrode and the interferent electrode each have a layer of a conductive material, (ii) the working electrode further comprises at least one enzyme, and (iii) the interferent electrode is devoid of enzyme, wherein the working electrode is surrounded by the interferent electrode to the extent sufficient to cause the interferents reacting with the working electrode to be reduced such that additional calculations of the interferent current are not necessary to determine analyte concentration; and
- wherein the conductive material of the interferent electrode and the working electrode is the same.

17. The implantable analyte sensor of claim 16, wherein the interferent electrode substantially surrounds the working electrode.

* * * * *